US006633760B1

(12) United States Patent
Ham et al.

(10) Patent No.: US 6,633,760 B1
(45) Date of Patent: Oct. 14, 2003

(54) METHOD FOR RECONNECTION OF A DROPPED CALL IN MOBILE COMMUNICATION SYSTEM

(75) Inventors: Seok-Jin Ham, Seoul (KR); Kyung-Joon Chun, Seoul (KR); Nak-Koo Kim, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/454,807

(22) Filed: Dec. 3, 1999

(30) Foreign Application Priority Data

Dec. 3, 1998 (KR) .......................................... 98-52760

(51) Int. Cl.[7] ................................................ H04Q 7/20

(52) U.S. Cl. ....................... 455/422; 455/436; 455/414; 455/450; 455/439

(58) Field of Search ................................ 455/414, 412, 455/413, 422, 436, 450, 452, 453, 424, 435, 432, 439

(56) References Cited

U.S. PATENT DOCUMENTS 5,544,224 A * 8/1996 Jonsson et al. ............. 455/434
5,842,128 A * 11/1998 Kito et al. .................. 455/432
5,995,830 A * 11/1999 Amin et al. ................ 455/423
6,032,040 A * 2/2000 Choy ......................... 455/414
6,175,733 B1 * 1/2001 Seekins et al. ............. 455/434
6,215,782 B1 * 4/2001 Buskens ..................... 370/350
6,246,872 B1 * 6/2001 Lee ............................ 455/414
6,249,681 B1 * 6/2001 Virtanen ..................... 455/466
6,263,207 B1 * 7/2001 Kito ........................... 455/452
6,275,706 B1 * 8/2001 Rune .......................... 455/432
6,275,713 B1 * 8/2001 Toda .......................... 455/564
6,292,551 B1 * 9/2001 Entman et al. ........ 379/221.04
6,343,216 B1 * 1/2002 Kim et al. ................. 455/450
6,445,918 B1 * 9/2002 Hellander ................... 455/423
6,445,921 B1 * 9/2002 Bell ........................... 455/426

FOREIGN PATENT DOCUMENTS

EP 0526240 A2 * 3/1993 ............ H04Q/7/04
EP 0740486 A2 * 10/1996 ............ H04Q/7/38
JP 406315006 A * 11/1994

* cited by examiner

*Primary Examiner*—Dwayne Bost
*Assistant Examiner*—Sujatha Sharma
(74) *Attorney, Agent, or Firm*—Dilworth & Barrese, LLP

(57) ABSTRACT

Reconnection of a dropped call in a mobile communicating system. In the situation that a call drop occurs and a call is to be disconnected during a call service, a mobile station is informed of the call drop and the call is reconnected or disconnected according to a response of the mobile station without being released by a unilateral decision by a system. Furthermore, when the call drop occurs, the mobile station searches for an available channel and requests a call reconnection to the system.

14 Claims, 11 Drawing Sheets

600

| INFORMATION ELEMENT | Direction | Type |
|---|---|---|
| MESSAGE TYPE | MSC->BS | M |
| CHANNEL TYPE | MSC->BS | M |
| LAYER 3 HEADER INFORMATION | MSC->BS | M |
| SIGNALLING TYPE | MSC->BS | O |
| PRIORITY | MSC->BS | O |
| CIRCUIT IDENTITY CODE | MSC->BS | O |
| CELL IDENTIFIER | MSC->BS | O |
| CHANNEL NUMBER | MSC->BS | O |
| ENCRYPTION INFORMATION | MSC->BS | O |
| TRANSCODER MODE | MSC->BS | O |
| PERSONAL STATION IDENTITY | MSC->BS | O |
| SERVICE OPTION | MSC->BS | O |
| *MSC CALL IDENTITY* | *MSC->BS* | *M* |

| 7 | 6 | 5 | 4 | 3 | 2 | 1 | 0 | OCTET |
|---|---|---|---|---|---|---|---|---|
| ELEMENT IDENTIFIER | | | | | | | | 1 |
| CALL_ID (4 OCTET) | | | | | | | | 2 |
| | | | | | | | | 3 |
| | | | | | | | | 4 |
| | | | | | | | | 5 |

FIG.6B

| PAGING CHANNEL COMMAND | FORWARD CHANNEL COMMAND | COMMAND CODE ORDER (BINARY) | COMMAND ID ORDQ (BINARY) | ACTION_TIME DESIGNATION | ADDITIONAL FIELD OTHER THAN ORDQ | COMMAND/ FUNCTION |
|---|---|---|---|---|---|---|
| ~ | ~ | ~ | ~ | ~ | ~ | ~ |
| Y | Y | 010101 | 00000000 | N | N | RELEASE COMMAND (NO REASON) |
| Y | Y | 010101 | 00000010 | N | N | RELEASE COMMAND (REQUESTED SERVICE OPTION REJECTED) |
| 620 Y | Y | 010101 | 00000011 | N | N | RELEASE COMMAND (CHECK REQUEST TO MS) |
| N | Y | 010111 | 00000000 | Y | N | LONG CODE TRANSITION COMMAND REQUEST |

METHOD FOR RECONNECTION OF A DROPPED CALL IN MOBILE COMMUNICATION SYSTEM

BACKGROUND OF THE INVENTION

1. Field of the Invention

The present invention relates generally to the field of wireless communications, and in particular, to a method of reconnecting a dropped call in a mobile communication system.

2. Description of the Related Art

In a public land mobile network (PLMN), a connection is made between a base station (BS) and a mobile station (MS) in a radio environment. In some cases, adequate call service cannot be provided in shadow areas due to physical characteristics of the environment which adversely affects radio signal propagation. In the case where a terminal subscriber roams on foot or is moving in a vehicle, a call can be temporarily dropped.

In accordance with conventional technology, a call is disconnected by a system even if an MS wants to continue the call (1) when the call is temporarily dropped in shadow areas due to the physical characteristics of the environment; (2) in an abnormal handoff situation; and (3) due to problems in power control.

More specifically, if a call drop lasts for a predetermined time period in the shadow areas or due to physical characteristics of the environment, it is determined that a call service cannot be provided and the call is released. In IS-95, the predetermined time is approximately 5 seconds (i.e., equal to one frame duration 20 ms×270). Upon such unintended call release, a calling party must again attempt to call the called party to resume the call.

If a service impediment occurs during handoff between an MS and a BS with which the MS has a communication link maintained, a control operation is performed through the old BS, despite the good signal propagation environments of adjacent BS, which results in the communication link being disconnected.

Power control implementation between a BS and MSs is every sensitive, especially in CDMA. It is essential to minimize transmission power since signals transmitted from a specific MS and a specific BS are considered to be noise from the perspective of other MSs and BSs. Therefore, when a BS determines that unreliable power control in a specific MS causes a call drop in the system, it disconnects the call immediately to eliminate the source of the call drop.

SUMMARY OF THE INVENTION

An object of the present invention is to provide a method of improving call disconnection during a call service in a mobile communication system.

Another object of the present invention is to provide a method of processing a call which is dropped and is to be disconnected based on an MS response in a negotiation.

A further object of the present invention is to provide an unnecessary call disconnection prevention method wherein unnecessary call disconnection of a system based on its unilateral decision about abnormality of a radio channel is prevented and an MS response is checked.

Still another object of the present invention is to provide a method of maintaining a call service wherein upon detection of an abnormality in a radio environment, an MS searches for a new signal propagation environment and requests reconnection of an existing call to a BS system available for communication.

Yet another object of the present invention is to provide a method of maintaining a call service by requesting call reconnection on an available channel when one of the forward and reverse channels is abnormal.

Briefly, these and other objects are accomplished by a method of reconnecting a communication link terminated by a service impediment during a service between an MS subscriber and a subscriber communicating with the MS subscriber terminal through a mobile communication system having a plurality of Mobile Switching Centers (MSCs) connected to one another, each MSC being connected to a plurality of BSs. In the method, the MS receives information about the location and call connection of the MS from a BS and an MSC connected to the MS and stores the received information during the service between the MS subscriber and the other subscriber. If the service impediment lasts for at least a first predetermined time period, the MS transmits the stored MS location and call connection information.

BRIEF DESCRIPTION OF THE DRAWINGS

The above and other objects, features and advantages of the present invention will become more apparent from the following detailed description when taken in conjunction with the accompanying drawings in which:

FIG. 6A illustrates the format of a signal Assignment Request including an element MSC Call_ID;

FIG. 6B illustrates in detail the structure of MSC Call_ID shown in FIG. 6A according to the embodiment of the present invention;

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Terms and Definitions

"A call service in progress": a state where voice communication and data communication of still images, moving pictures, and the like are being performed.

"Dropped call": is defined as a call provided in a call service which can no longer be maintained either temporarily or permanently. A dropped call may be caused by either a (single directional and bi-directional) call disconnection, noise on a specific channel, and other service unavailable situations.

"Call disconnection": is the state where a call remains disconnected for a predetermined time.

An embodiment of the present invention will be described with in the context with the North American digital mobile communication system standard (IS-95, IS-634, and IS-41 series) by way of example. The present invention is also applicable to third generation mobile communication (CDMA 2000, UMTS) which provides the additional services of high quality voice, high speed data, moving pictures, and Internet browsing.

Figure 1:
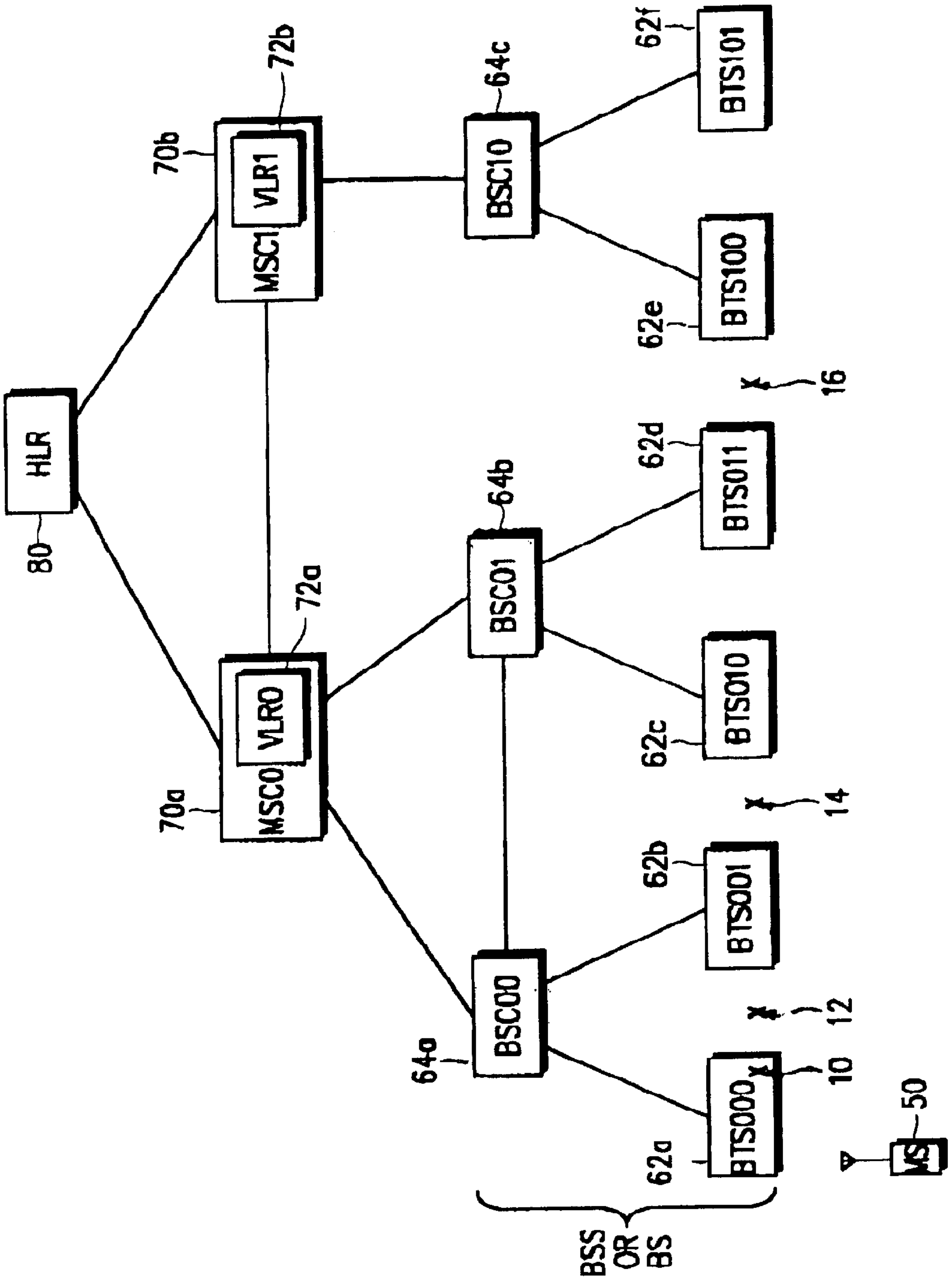
FIG. 1 is a block diagram of an example of a mobile communication system to which an embodiment of the present invention is applied.

Referring to FIG. 1, the mobile communication system to which the present invention is applied includes an HLR (Home Location Register) 80, MSCs (Mobile Switching Centers) MSC0 70*a* and MSC1 70*b*, BSCs (Base Station Controllers) BSC00 64*a*, BSC01 64*b*, and BSC10 64*c*, BTSs (Base Station Transceiver Subsystems) BST000 62*a* to BTS011 62*f*, and an MS 50. A plurality of HLRs and MSCs are interconnected in the PLMN to perform subscriber management and call switching. As shown in FIG. 1, the single HLR 80 is connected to a plurality of MSCs MSC0 70*a* and MSC1 70*b*. Each MSC is in turn connected to a plurality of BSCs, and each BSC to a plurality of BTSs. A BS is typically comprised of a BSC and BTSs.

An MSC controls a connection to the PSTN (Public Switch Telephone Network) and the PLMN. A BSC controls a radio link and performs a handoff, a BTS forms a radio link with an MS and manages radio resources, and an HLR registers subscriber locations and serves as a database for storing subscriber information. Each MSC has a VLR (Visitor Location Register) for temporarily storing the information of an MS entering the service area of the MSC. If the MS moves into another service area, the stored information is discarded.

For a call set-up, the mobile communication system assigns radio channels between an MS and a BTS, forms communication links between the BTS and a BSC, between the BSC and an MSC, and between the MSC and the PLMN or an external network such as PSTN. If the established call cannot be maintained for a predetermined time because the MS is in a shadow area or due to characteristics of the radio environment, the mobile communication system typically disconnects the call. Shadow area problems may arise from a number of situations including, for example, an elevator, a relay-free tunnel, a long tunnel located between adjacent cells, or a shadow area among dense tall buildings.

A call drop as defined in the embodiment of the present invention can occur in such locations as indicated by reference numerals 10, 12, 14, and 16 in FIG. 1.

Reference numerals 10, 12, and 14 indicate locations of a dropped call within the same MSC area, and reference numeral 16 indicates a location of a dropped call between BTSs covered by different MSCs. Specifically, reference numeral 10 denotes a call dropped location of the MS 50 communicating with the BTS000 62*a* within the coverage area of the BTS000 62*a*, reference numeral 12 denotes a call dropped location of the MS 50 communicating with the BTS000 62*a* or the BTS001 62*b* in the service area of the BSC00 64*a*, and reference numeral 14 denotes a call dropped location of the MS 50 communicating with the BTS001 62*b* or the BTS010 62*c* on the border of their coverage areas.

In accordance with the embodiment of the present invention, when a call drop occurs during a call service (a call) in the aforestated service impediment situations (1), (2), and (3) in a mobile communication system, an MS is notified of the call drop and the call is reconnected or disconnected according to an MS response for the call drop before the call is released by the system.

Figure 2:
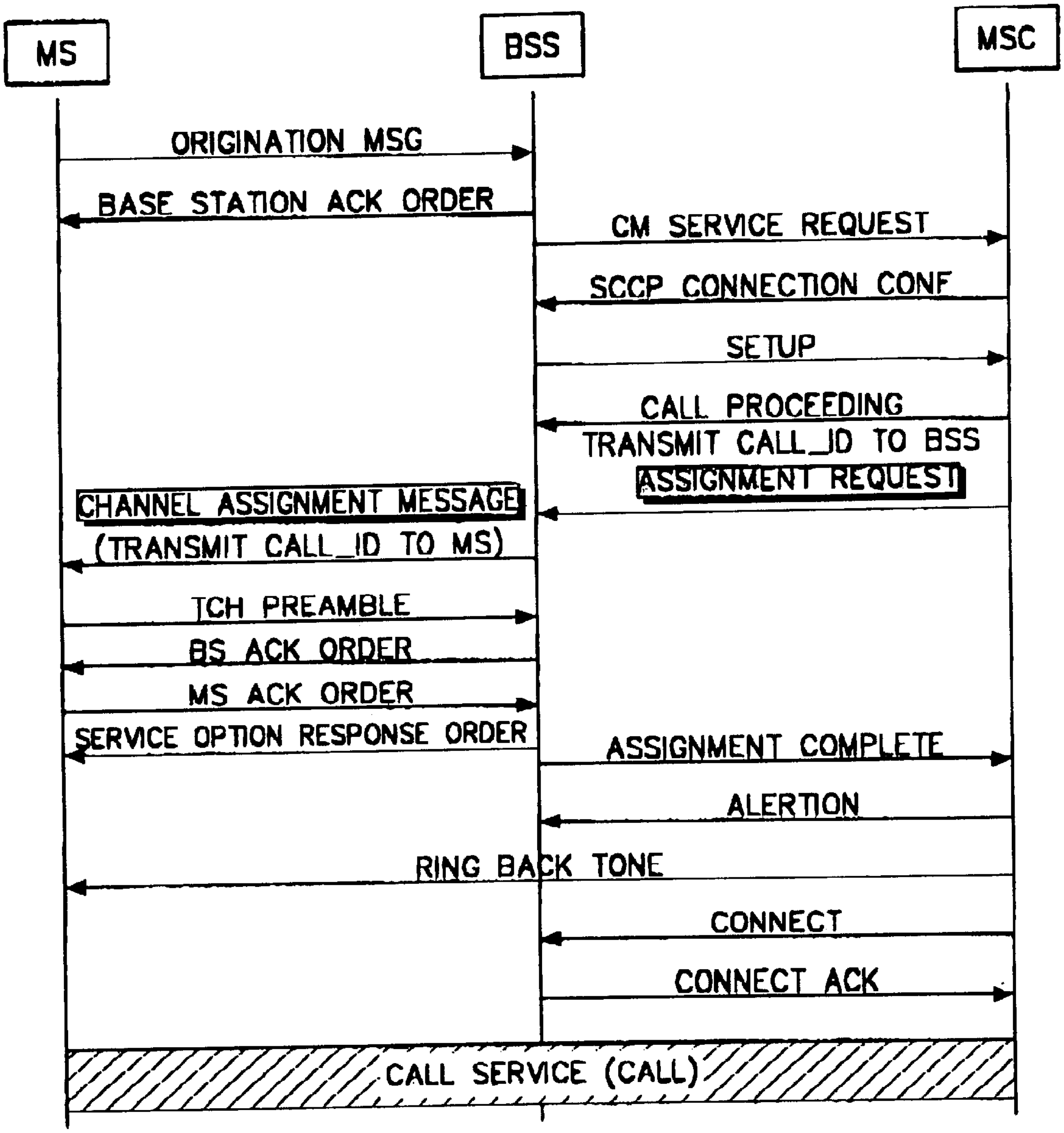
FIG. 2 is a flowchart illustrating an originated call set-up procedure according to an embodiment of the present invention.
Figure 3:
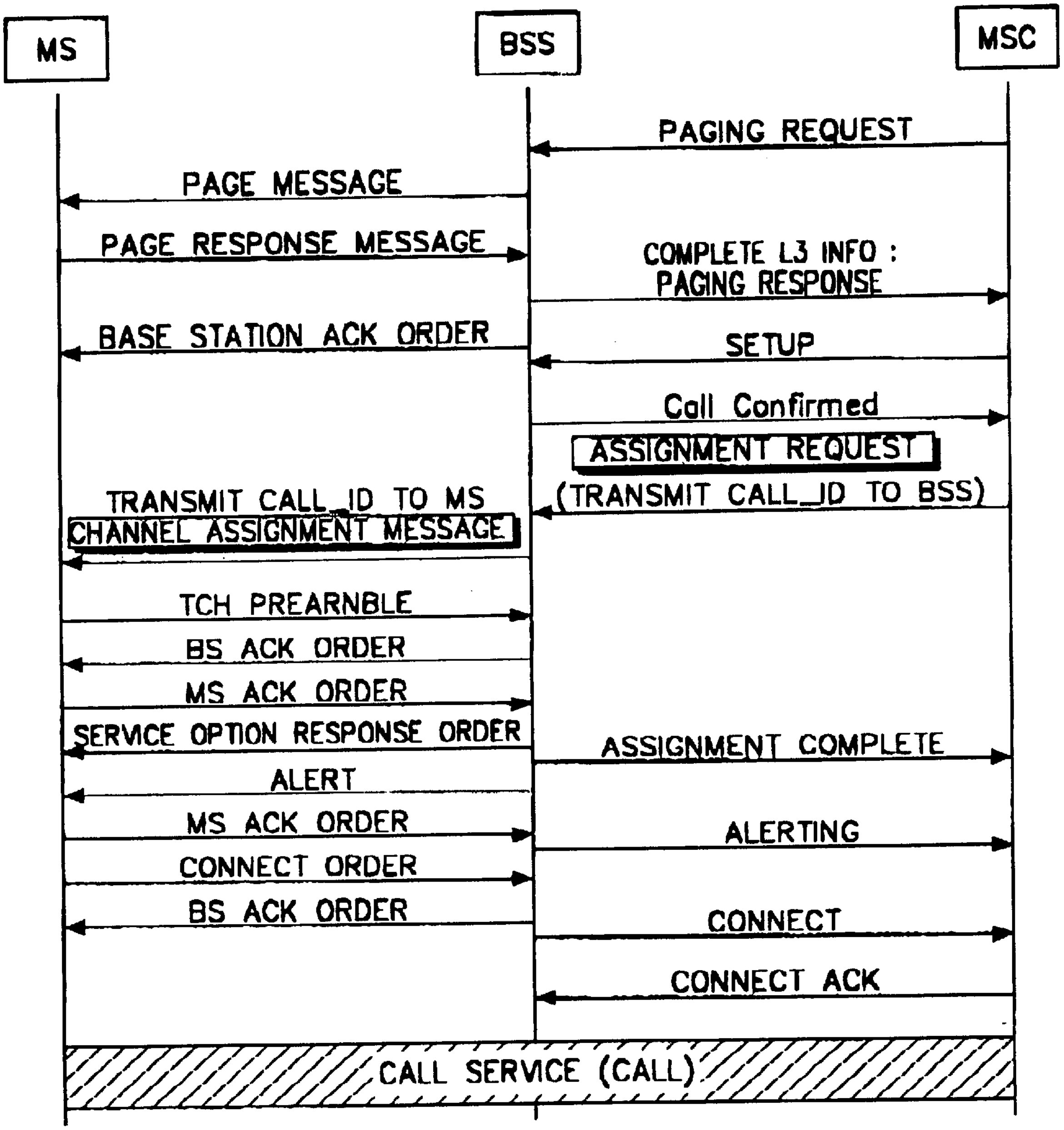
FIG. 3 is a flowchart illustrating a terminated call set-up procedure according to the embodiment of the present invention.

FIGS. 2 and 3 illustrate signal flows for set up of an originated call and a terminated call according to the embodiment of the present invention, respectively. Referring to FIG. 2, the originated call set-up procedure according to the embodiment of the present invention is similar to a conventional one. The former differs from the latter in that (1) an MSC adds an element MSC Call_ID for identifying an MSC call to a signal Assignment Request for transmission to a BSS. The signal Assignment Request with MSC Call_ID is shown in FIGS. 6A and 6B; and (2) the BSS adds Call_ID (MSC and BSS) being a combination of MSC Call_ID received from the MSC and BSS Call_ID for identifying a BSS call to a signal Channel Assignment Message, for transmission to an MS. The structure of the signal Channel Assignment Message with Call_ID (MSC and BSS) is similar to that of the signal shown in FIGS. 6A and 6B.

The MS stores Call_ID (MSC and BSS) received from the BSS, a network ID N_ID, and Cell_ID in its memory at a call set-up. Upon a call reconnection request, the information is transmitted to the system for use in call reconnection. That is, N_ID, Cell_ID, and Call_ID (MSC and BSS) stored in the MS have values for the initial call set-up. Here, N_ID indicates which MSC the MS belongs to, Cell_ID indicates which cell the MS belongs to, and Call_ID (MSC and BSS) is the ID of a call connected for the MS among connected calls in the MSC and the BSS. A call can be reconnected without Call_ID (MSC and BSS) in the present invention, but in this case, the MSC and the BSS are required to search for the corresponding MS by referring to their call connection-associated tables, thereby consuming a relatively long time to detect the MS. Therefore, the preferred embodiment of the present invention will be described in context with the case of Call-ID (MSC and BSS) used.

Referring to FIG. 3, the terminated call set-up procedure according to the embodiment of the present invention is similar to a conventional one. The difference between the present invention and the prior art in terms of call termination can be found in the description of the difference in terms of call origination.

Assignment Request directed from the MSC to the BSS in FIGS. 2 and 3 includes MSC Call_ID according to the embodiment of the present invention. FIGS. 6A and 6B illustrate the structures of Assignment Request and MSC Call_ID, respectively.

The signal Assignment Request as provided in IS-634 includes information elements indicated by reference numeral 600 in FIG. 6A. In the embodiment of the present invention Assignment Request further has an information element MSC Call Identity indicated by reference numeral 610. Referring to FIG.6B, MSC Call Identity is comprised of Element Identifier (1 octet) and Call_ID (4 octets).

A signal Channel Assignment Message transmitted to the MS by the BSS in FIGS. 2 and 3, similar to Assignment Request including MSC Call_ID in structure, is constructed by adding MSC Call_ID (4 octets) received from the MSC, BSS Call_ID (4 octets) for identifying a BSS call, and Cell_ID (2 octets) for identifying a current cell to an existing message.

A signal Origination Message transmitted to the BSS by the MS in FIG. 2, similar to the Assignment Request signal, is constructed by adding MSC Call_ID (4 octets), BSS Call_ID (4 octets), Cell_ID (2 octets), and N_ID (2 octets) to an existing message.

To determine whether the MS requests a call reconnection, the BSS checks Call_ID (MSC and BSS), being a combination of MSC Call_ID and BSS Call_ID, among the above additional information elements in the Origination Message signal received from the MS. For example, if Call_ID (MSC and BSS) is 0xffffffff, the Origination Message is a normal origination signal and if Call_ID (MSC and BSS) has a different value, the Origination Message is used for call reconnection in the embodiment of the present invention.

Figure 4:
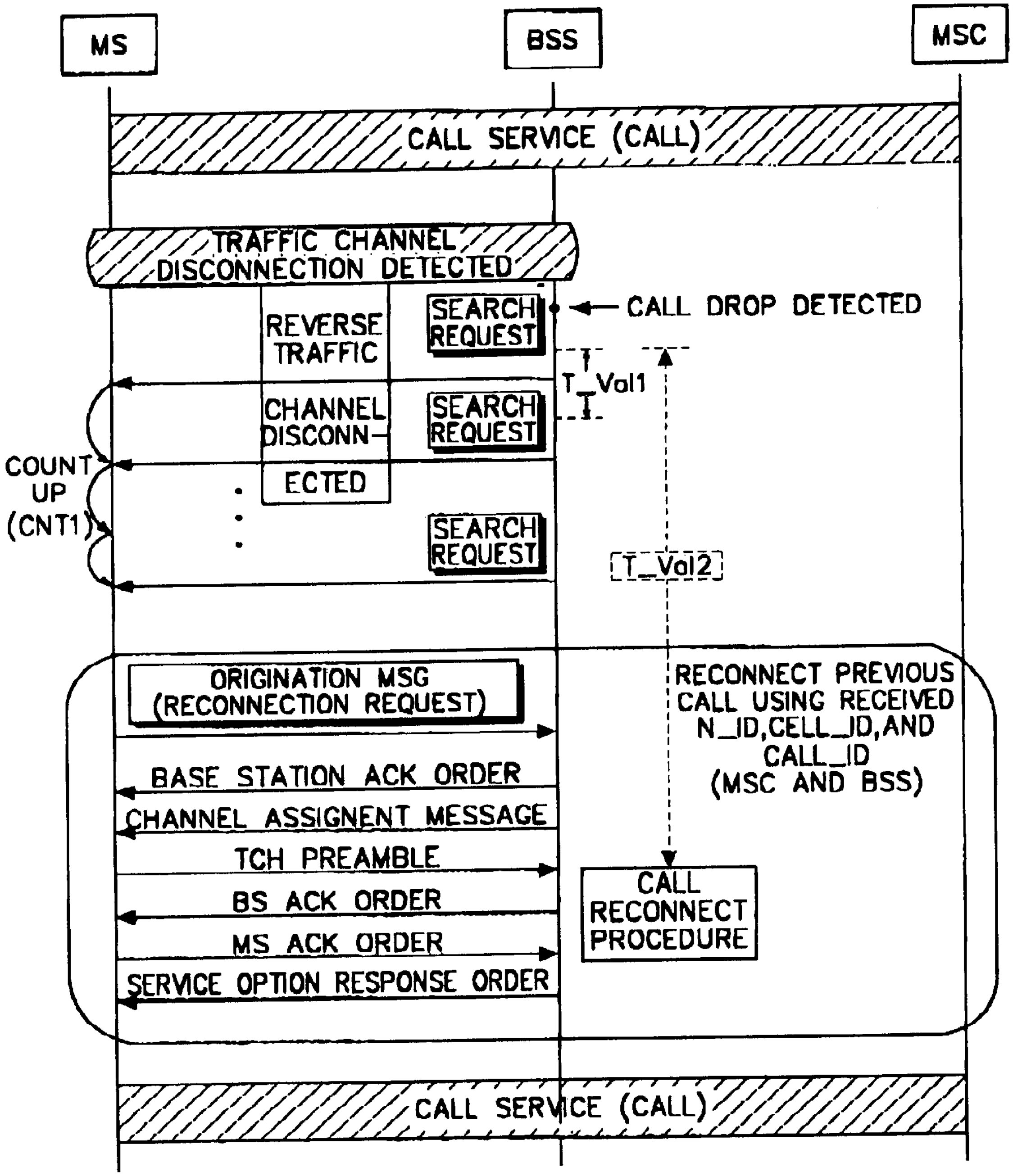
FIG. 4 is a flowchart illustrating a call reconnection process according to a system order according to the embodiment of the present invention.
Figure 5:
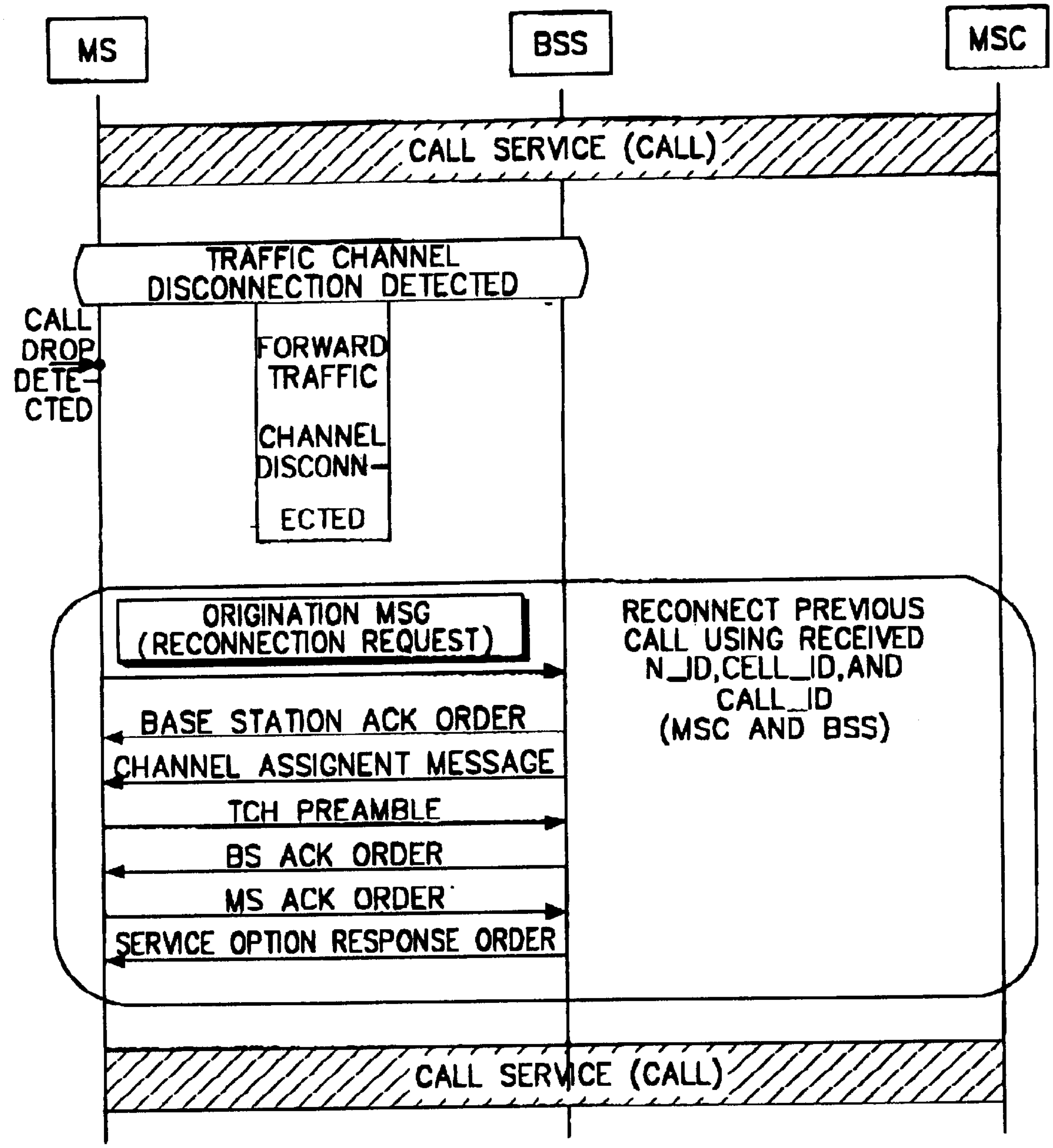
FIG. 5 is a flowchart illustrating a call reconnection process upon an MS request according to the embodiment of the present invention.

FIG. 4 is a flowchart illustrating a call reconnection process when the system orders a call to be reconnected in the embodiment of the present invention, and FIG. 5 is a flowchart illustrating a call reconnection process when the MS requests a call reconnection in the embodiment of the present invention.

Figure 7:
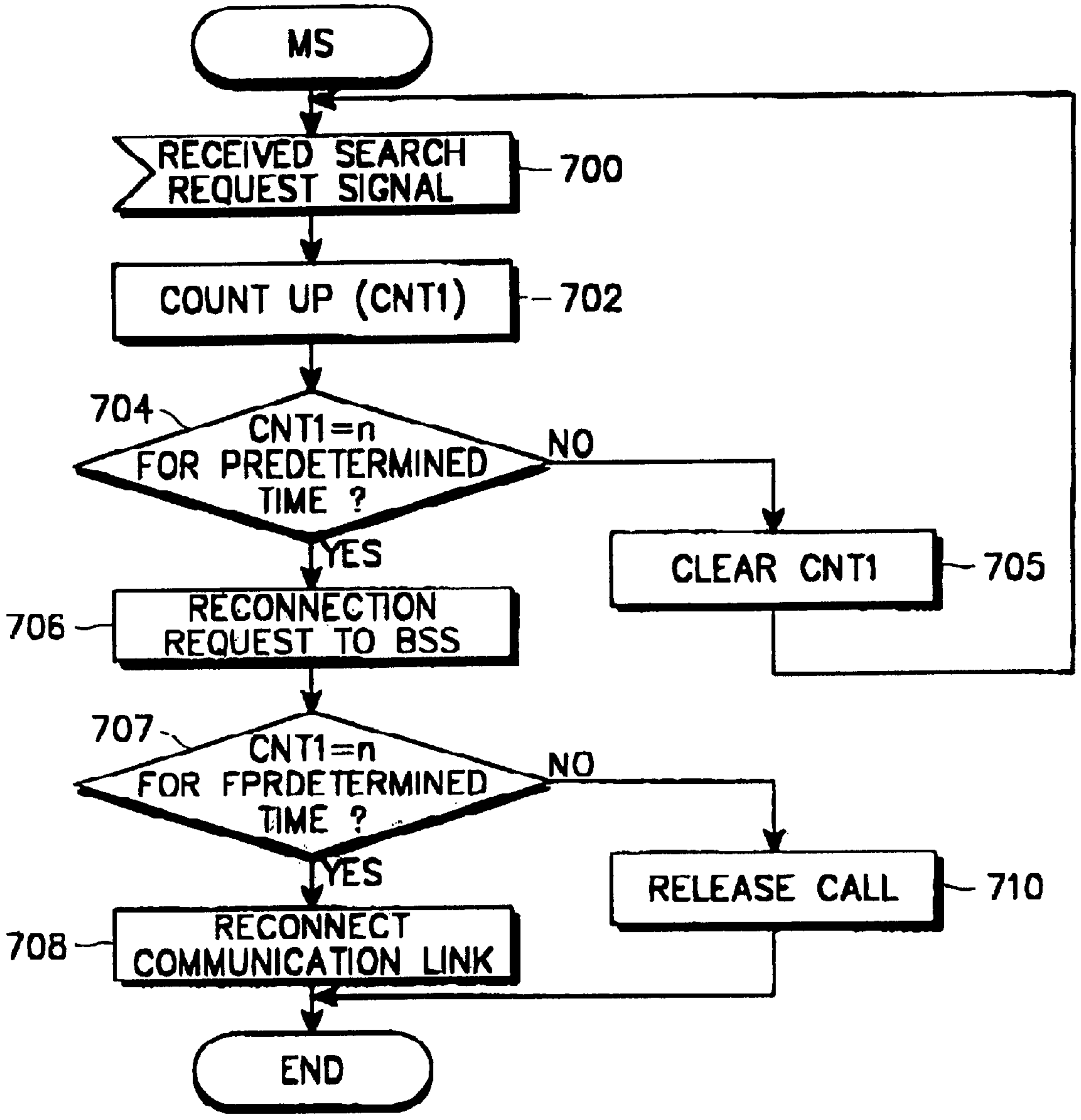
FIG. 7 is a flowchart illustrating a call reconnection control operation in an MS according to a system order according to the embodiment of the present invention.
Figure 8:
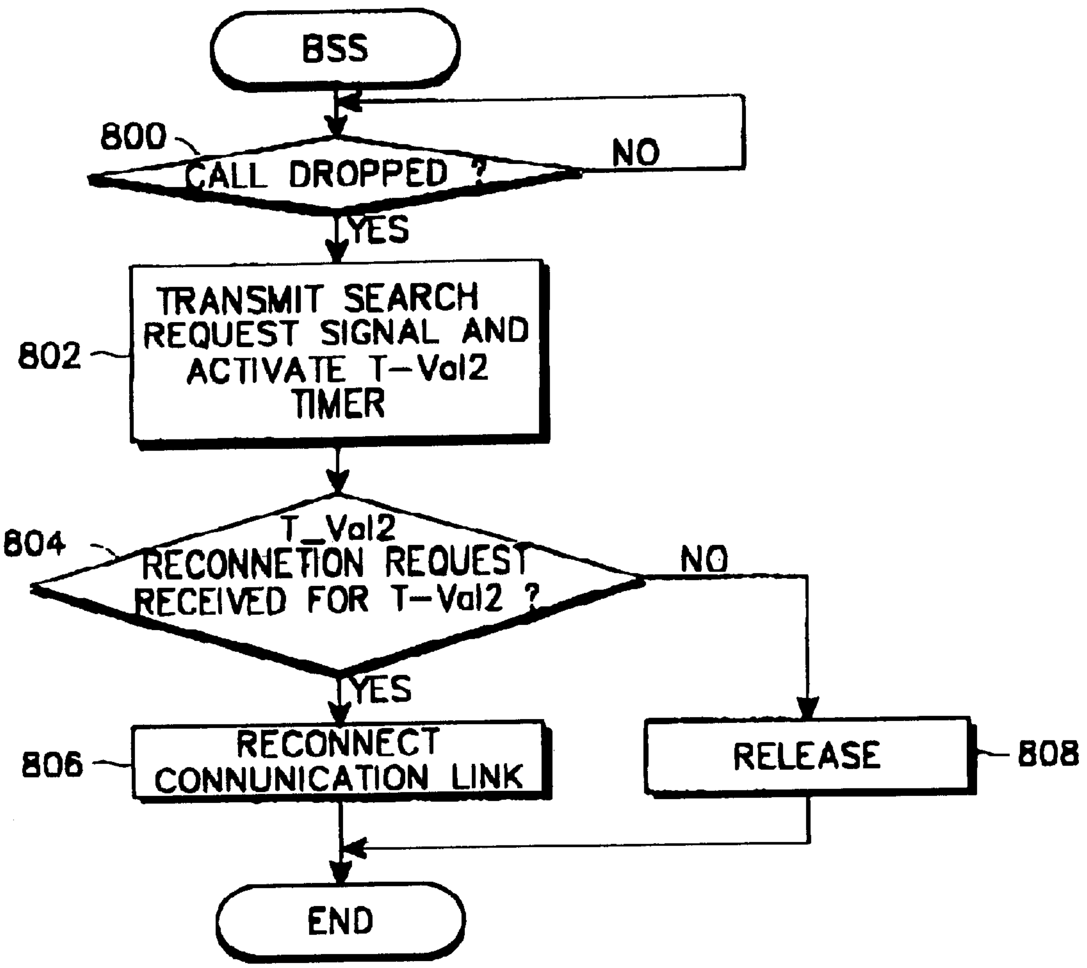
FIG. 8 is a flowchart illustrating a call reconnection control operation in a system (BSS and MSC) control operation upon a system order according to the embodiment of the present invention.
Figure 9:
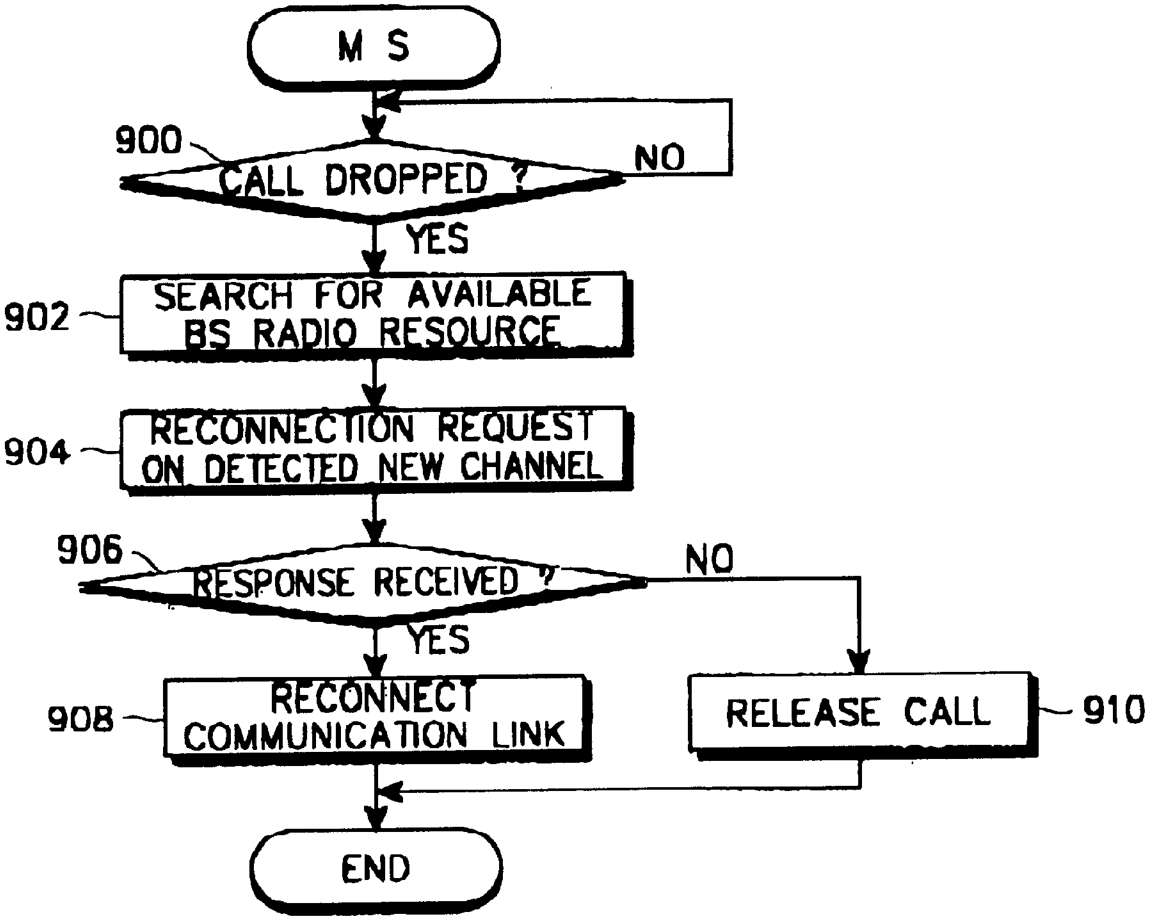
FIG. 9 is a flowchart illustrating a call reconnection control operation in the MS when the MS requests a call reconnection according to the embodiment of the present invention.
Figures 10, 11:
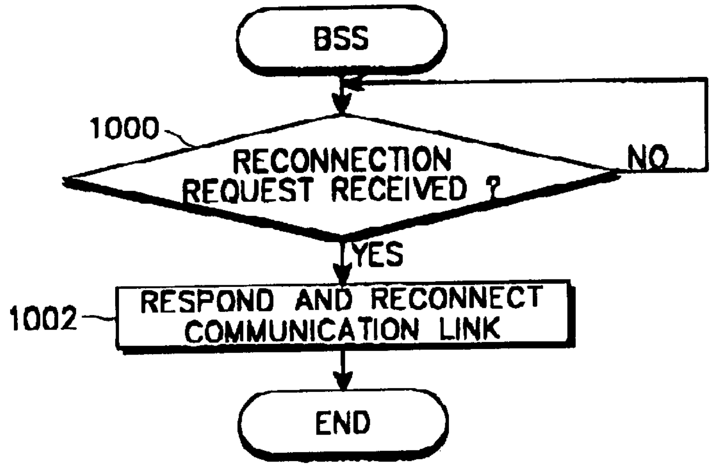
FIG. 10 is a flowchart illustrating a call reconnection control operation in the system (BSS and MSC) control operation when the MS requests a call reconnection according to the embodiment of the present invention.
FIG. 11 illustrates an example of an addition (indicated by reference numeral 620) to an existing command message.

FIG. 7 is a flowchart illustrating a call reconnection process in the MS when the system orders a call to be reconnected in the embodiment of the present invention, and FIG. 8 is a flowchart illustrating a call reconnection process in the system (BSS and MSC) when the system orders a call to be reconnected in the embodiment of the present invention. FIG. 9 is a flowchart illustrating a call reconnection process in the MS when the MS requests a call reconnection in the embodiment of the present invention, and FIG. 10 is a flowchart illustrating a call reconnection process in the system (BSS and MSC) when the MS requests a call reconnection in the embodiment of the present invention.

With reference to FIGS. 2 through 10, reconnection of a dropped call will be described according to the embodiment of the present invention.

Before describing a call reconnection upon a system order when a call is dropped mainly on a reverse channel in connection with FIGS. 4, 7, and 8, it is to be appreciated that an upper-layer MSC does not intervene in call reconnection when a call is dropped in a corresponding BSS, but it does when a call reconnection request is issued from another MSC.

When a call is established and then a reverse traffic channel currently in use for the call service (call) is disconnected, the BSS determines whether the call has been dropped in step 800 of FIG. 8. As disclosed in U.S. application Ser. No. 09/294,046, if no frames have been received for a predetermined time (one to ten seconds) on the current traffic channel, the BSS considers that the call has been dropped. The predetermined time is preferably up to hundreds of milliseconds.

Upon detection of the call drop on the current traffic channel, the BSS transmits a search request signal to the MS at predetermined times at every T-Val intervals in step 802 of FIG. 8. The timer value T_Val1 ranges from 1 to 10 seconds, preferably from 1 to 2 seconds and varies with system operation status and subscriber characteristics for an operator. The search request signal is a message requesting a check of the MS. In accordance with the embodiment of the present invention, an existing command message for a request to an MS is used for the search request message. FIG. 11 illustrates an example of the existing command message and an added command indicated by reference numeral 620 according to the embodiment of the present invention. The added command represents a check request to an MS.

In step 802 of FIG. 8, the BSS activates a T-Val2 timer at the time when the first search request signal is transmitted to the MS. The timer value T-Val2 indicates the action time of determining that a call release, that is, a general call disconnection should be performed when the BSS receives no response for the search request signal repeatedly transmitted to the MS. T-Val2 ranges from 5 to 60 seconds, preferably 10 seconds, and varies with system operation status and subscriber characteristics for an operator.

Meanwhile, upon receipt of the search request signal from the BS n times (n is a natural number) over a predetermined time period, the MS requests a call reconnection to the BSS in steps 700 to 706 of FIG. 7. n is a reference number for the MS to transmit the Origination Message requesting call reconnection after receipt of the search request signal from the BSS, counted by a counter CNT1. n is preferably 1 to 3. Since a reverse traffic channel is disconnected but the MS is not informed of the channel disconnection, the MS counts up every time it receives the search request signal and considers that the received signal is the search request signal for call reconnection request upon receipt of the signal one to three times, to thereby check whether the search request signal received from the BSS is valid data.

Then, the MS transmits the Origination Message (Reconnection Request) to the BSS in step 706 of FIG. 7, including N_D. Cell_ID, and Call_ID (MSC and BSS) stored in the MS at the initial call set-up. If the MS fails to receive a response signal for the reconnection request n times for a predetermined time period in step 707 of FIG. 7, it releases the call in step 710 of FIG. 7.

Meanwhile, the BSS determines whether the Origination Message (Reconnection Request) has been received from the MS before the T-Val2 timer expires in step 804 of FIG. 8. Upon receipt of the Origination Message (Reconnection Request), the BSS and the MSC reconnect the call based on the information about N_ID, Cell_ID, and Call_ID (MSC and BSS) of the Origination Message (Reconnection Request) in step 806 of FIG. 8. That is, they re-establish the communication link for the terminated call. If the system (BSS and MSC) which receives a call reconnection-related signal is different from the system which set up the initial call, the call is reconnected by handoff, and then the previous communication link is released. For example, in the case that a call reconnection request is generated within the same BSS, the previous MS-BTS radio link or the previous MS-BSC radio link is released, whereas in the case the call reconnection is generated from another MSC, the previous BSS-MSC radio link is also released.

If the BSS has not received the reconnection request from the MS, the BSS performs a normal call disconnection-caused release procedure in step 808 of FIG. 8.

Upon receipt of a reconnection-related signal from the BSS which reconnects the communication link in step 806 of FIG. 8, the MS performs a communication link reconnection procedure in step 708 of FIG. 7.

A description of a call reconnection upon an MS request for call reconnection when a call is dropped mainly on a forward channel in connection with FIGS. 5, 9, and 10 will now be provided. It is to be appreciated here that an upper-layer MSC does not intervene in call reconnection when a call is dropped in a corresponding BSS, but it does when a call reconnection request is issued from another MSC.

When a call is established and then a forward traffic channel in current use for the call service (call) is disconnected, the MS determines whether the call has been dropped in step 900 of FIG. 9. As disclosed in U.S. application Ser. No. 09/294,046, if no frames have been received for a predetermined time (one to ten seconds) on the current traffic channel, the MS considers that the call has been dropped. The predetermined time is preferably up to hundreds of milliseconds.

Upon detection of the call drop on the current traffic channel, the MS detects available BTS radio resources using of its internal searcher in step 902 of FIG. 9 to thereby find a new channel which can provide the best connection signal for the current location of the MS.

Then, the MS transmits the reconnection request signal Origination Message (Reconnection Request) to the BSS on the detected new channel, including the information about N_ID, Cell_ID, and Call_ID (MSC and BSS) stored in the MS at the initial call set-up, in step 904 of FIG. 9.

The BSS determines whether the Origination Message (Reconnection Request) has been received from the MS in step 1000 of FIG. 10. Upon receipt of the Origination Message (Reconnection Request), the BSS and MSC reconnect the terminated call based on the information about N_ID, Cell_ID, and Call_ID (MSC and BSS) of the Origination Message (Reconnection Request) in step 1002 of FIG. 10. That is, they re-establish the communication link for the terminated call. If the system (BSS and MSC) which receives a call reconnection-related signal is different from the system which set up the initial call, the call is reconnected by handoff, and then the previous communication link is released. In the case of the same BSS, only an MS-BTS radio link or the previous MS-BSC radio link is released. On the other hand, if another MSC requests a call reconnection, even a BSS-MSC radio link is released.

Upon receipt of a reconnection-related signal from the BSS which reconnects the communication link in step 906 of FIG. 9, the MS also performs a communication link reconnection procedure in step 908 of FIG. 9. On the contrary, if the MS has not received the reconnection-related signal from the BSS in step 906 of FIG. 9, the MS performs a conventional call release procedure in step 910 of FIG. 9.

Figure 12:
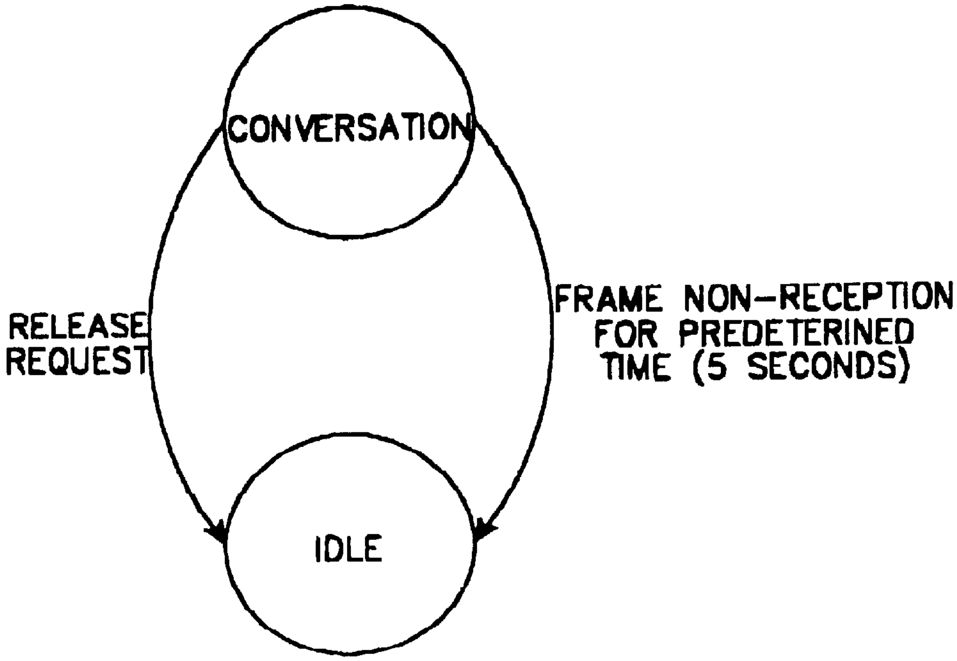
FIG. 12 is a state transition diagram for conventional call processing.
Figure 13:
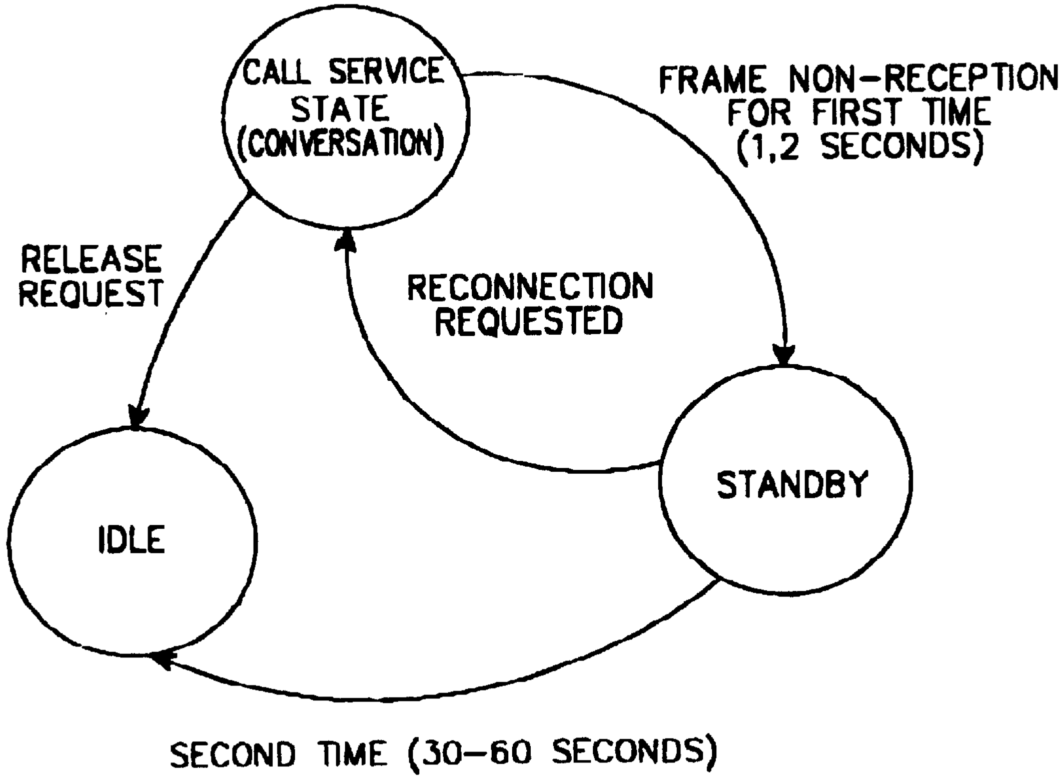
FIG. 13 is a state transition diagram for call processing according to the embodiment of the present invention.

FIGS. 12 and 13 are state transition diagrams for call processing in the prior art and according to the present invention, respectively. As shown in FIG. 9, upon a call release request or a call drop during a predetermined time, for example, 5 seconds during a call, a call release (call disconnection) state is entered directly in the prior art. In comparison to the prior art, as shown in FIG. 13, upon a call drop for a first time (e.g., up to hundreds of milliseconds) during a call service, a standby state is entered to await a call reconnection request, and the standby state transits to a conversation state upon the call reconnection request in the present invention. However, if the call drop lasts for a second predetermined time (preferably, 30 to 60 seconds) in the standby state, a release state is entered. If a call release is requested in the conversation or standby state, the release state is immediately entered.

In accordance with the present invention as described above, in the situation that a call drop occurs and a call is to be disconnected during a call service, an MS is informed of the call drop and the call enters a reconnection/standby/release state according to a response of the MS without being disconnected by a unilateral decision of the system. Furthermore, when the call drop occurs, the MS can search for an available channel and request a call reconnection to the system. Therefore, service quality can be increased for subscribers by limiting unnecessary call drops.

While the invention has been shown and described with reference to a certain preferred embodiment thereof, it should be understood by those skilled in the art that various changes in form and details may be made therein without departing from the spirit and scope of the invention as defined by the appended claims.

What is claimed is:

1. A method of reconnecting a communication link terminated by an interruption in service during a communication between a mobile station (MS) subscriber and a subscriber communicating with the mobile station subscriber through a mobile communication system having a plurality of mobile switching centers (MSCs) connected to one another, each MSC being connected to a plurality of base stations (BSs), the method comprising the steps of:

receiving information about the communication link from a service providing one of the plurality of BSs and an MSC connected to the service providing BS, said received communication link information being stored by the MS, during the service between the MS subscriber and the other subscriber; and transmitting the stored communication link information from the MS when the service interruption lasts for at least a first predetermined time period, wherein the communication link information includes one of information about the MSC connected to the service providing BS and a cell of the service providing BS when the service is set up for initiating, and information about a current MSC connected to a current service providing BS and a cell of the current service providing BS.

2. The method recited in claim 1, wherein the first predetermined time period is hundreds of milliseconds.

3. A method of reconnecting a communication link terminated by a service interruption on a reverse channel during a service between an MS subscriber and a subscriber communicating with the mobile station subscriber through a mobile communication system having a plurality of MSCs connected to one another, each MSC being connected to a plurality of BSs, the method comprising the steps of:

receiving information about the communication link from a service providing one of the plurality of BSs and an MSC connected to the service providing BS, said received communication link information being stored by the MS, during the service between the MS subscriber and the other subscriber;

receiving a search request from the service providing BSs at the MS when the service interruption lasts for at least a first predetermined time period; and transmitting the stored communication link information from the MS upon receipt of the search request by the BS, wherein the communication link information includes one of information about the MSC connected to the service providing BS and a cell of the service providing BS when the service is set up for initiating, and information about a current MSC connected to a current service providing BS and a cell of the current service providing BS.

4. The method recited in claim 3, wherein the first predetermined time period is hundreds of milliseconds.

5. The method recited in claim 3, wherein the search request is transmitted to the MS at least once.

6. The method recited in claim 3, wherein the search request is transmitted to the MS a predetermined number of times over a predetermined interval.

7. The method recited in claim 6, wherein the predetermined interval is 1 or 2 seconds.

8. The method recited in claim 6, wherein upon receipt of the search request from the current service providing BS the predetermined number of times, the MS transmits the stored communication link information.

9. The method recited in claim 3, wherein a command message directed from the service providing BSs to the MS is used as the search request.

10. The method recited in claim 3, wherein if the MS does not receive the search request signal for a predetermined time, the MS releases the service.

11. The method recited in claim 3, wherein if a current call service providing BS does not receive the communication link information from the MS for a predetermined time period after the service providing BSs transmit the search request, the service providing BS releases the service.

12. The method recited in claim 11, wherein the predetermined time period ranges from 5 to 60 seconds.

13. A method of reconnecting a communication link terminated by a service interruption on a forward channel during a communication between an MS subscriber and a subscriber communicating with the mobile station subscriber through a mobile communication system having a plurality of MSCs connected to one another, each MSC being connected to a plurality of BSs, the method comprising the steps of:

receiving information about the communication link from a service providing one of the plurality of BSs and an MSC connected to the service providing one of the plurality of BSs, said received communication link information being stored by the MS during the service between the MS subscriber and the other subscriber;

detecting an available BS radio resource by the MS if the service interruption lasts for at least a first predetermined time period; and transmitting the stored communication link information from the MS on a new channel detected in the BS radio resource detections wherein the communication link information includes one of information about the MSC connected to the service providing BS and a cell of the service providing BS when the service is set up for initiating, and information about a current MSC connected to a current service providing BS and a cell of the current service providing BS.

14. The method recited in claim 13, wherein the first predetermined time period is a few seconds.

* * * * *